(12) United States Patent
Werenka

(10) Patent No.: US 7,518,499 B2
(45) Date of Patent: Apr. 14, 2009

(54) SYSTEM AND METHOD FOR AUTONOMOUS INTERACTION AMONG NEIGHBORING SENSORS IN A NETWORK OF SENSORS

(75) Inventor: Leon K. Werenka, Mukilteo, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 223 days.

(21) Appl. No.: 11/248,405

(22) Filed: Oct. 12, 2005

(65) Prior Publication Data

US 2007/0080799 A1 Apr. 12, 2007

(51) Int. Cl.
G08B 29/00 (2006.01)
G08B 1/08 (2006.01)
G01S 1/00 (2006.01)

(52) U.S. Cl. ............ 340/506; 340/539.11; 340/539.13; 340/539.15; 340/539.21; 342/357.06; 701/213

(58) Field of Classification Search ................ 340/506, 340/539.11, 539.13, 539.15, 539.21; 342/357.06, 342/357.07; 701/213
See application file for complete search history.

(56) References Cited

U.S. PATENT DOCUMENTS

| | | | | |
|---|---|---|---|---|
| 4,812,820 | A | * | 3/1989 | Chatwin .................... 340/518 |
| 5,386,209 | A | * | 1/1995 | Thomas .................. 340/539.14 |
| 5,731,757 | A | * | 3/1998 | Layson, Jr. ................ 340/573.1 |
| 6,166,679 | A | * | 12/2000 | Lemelson et al. ............. 342/45 |
| 6,492,941 | B1 | * | 12/2002 | Beason et al. ............ 342/357.1 |
| 6,731,214 | B2 | * | 5/2004 | Kuo ........................ 340/573.1 |
| 6,812,840 | B2 | * | 11/2004 | Gehlot et al. ............ 340/572.1 |
| 2002/0198659 | A1 | * | 12/2002 | Doyle et al. ................ 701/300 |
| 2003/0012168 | A1 | | 1/2003 | Elson et al. |

FOREIGN PATENT DOCUMENTS

| WO | 01 26327 | 4/2001 |
|---|---|---|
| WO | 2005 024751 | 3/2005 |
| WO | 2006 023505 | 3/2006 |

OTHER PUBLICATIONS

GB Search Report Under Section 17 dated Feb. 23, 2007.

* cited by examiner

*Primary Examiner*—Donnie L Crosland

(57) ABSTRACT

Sensors in a network each have a geographical location and they each periodically broadcast this information to all the sensors in the network. Each receiving sensors then builds a list of sensors (neighbor list) that are closest to that sensor by computing the distance between itself and the other sensors. This list can then be used along with a decision algorithm to decide whether that sensor should act or perform a command when it receives a message from other sensors. In one embodiment, a sensor can use the neighbor list to command a specific other sensor(s) to perform a specific function.

16 Claims, 3 Drawing Sheets

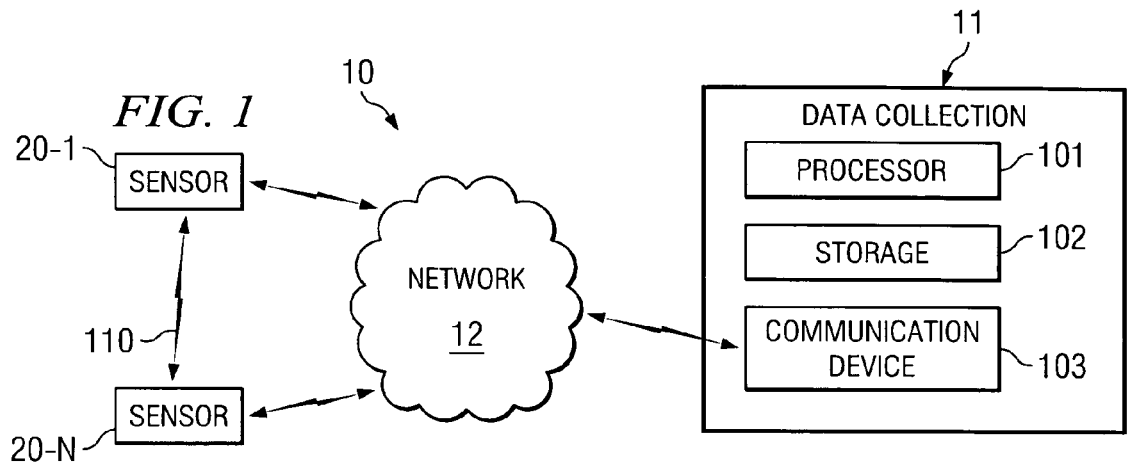
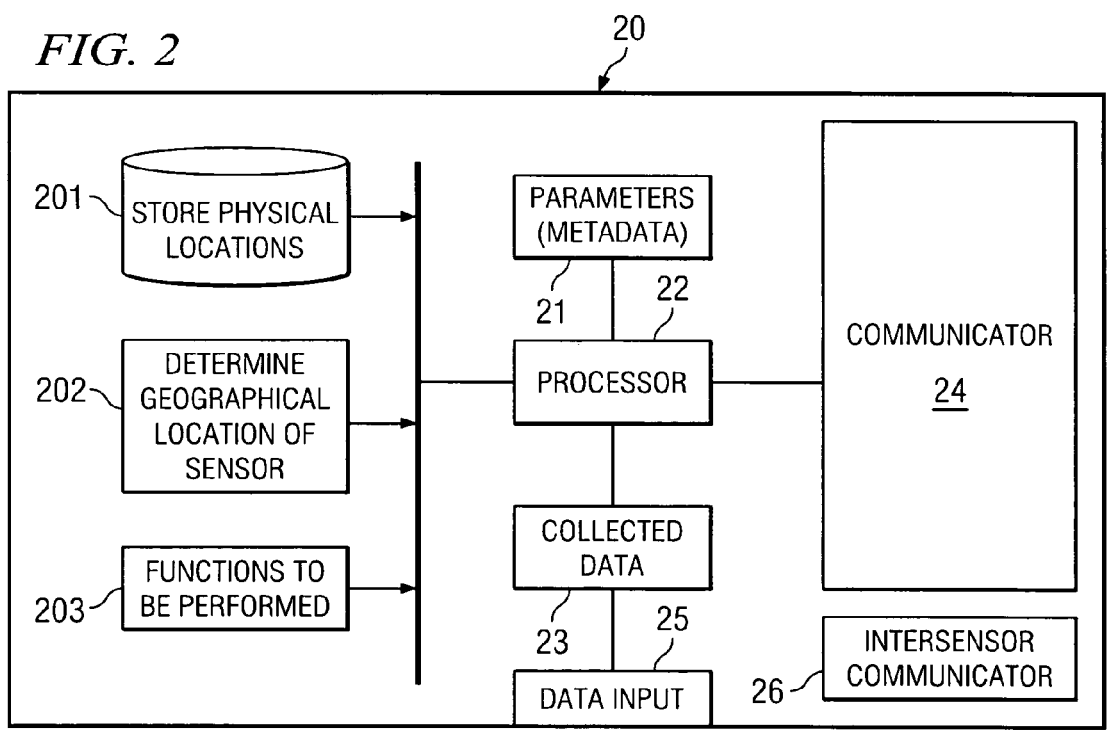

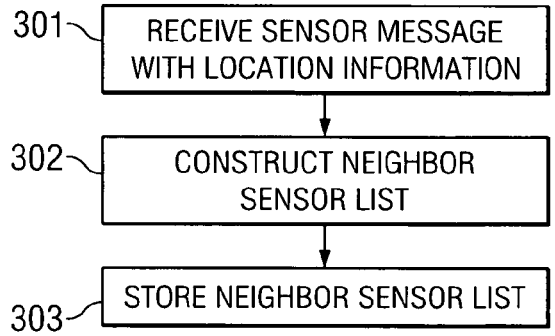
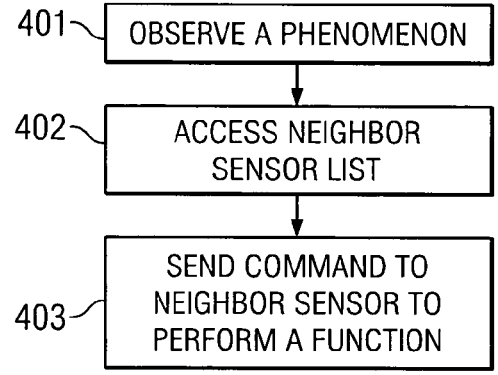
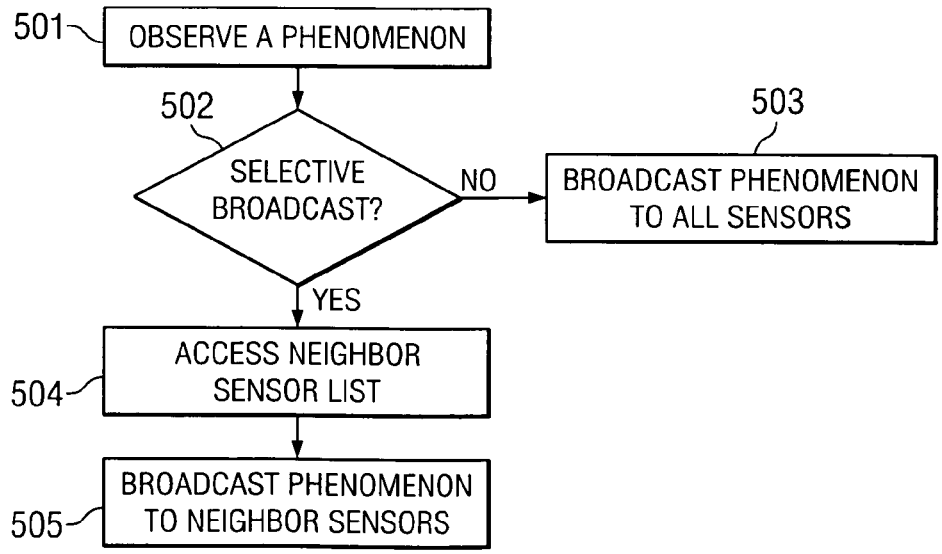

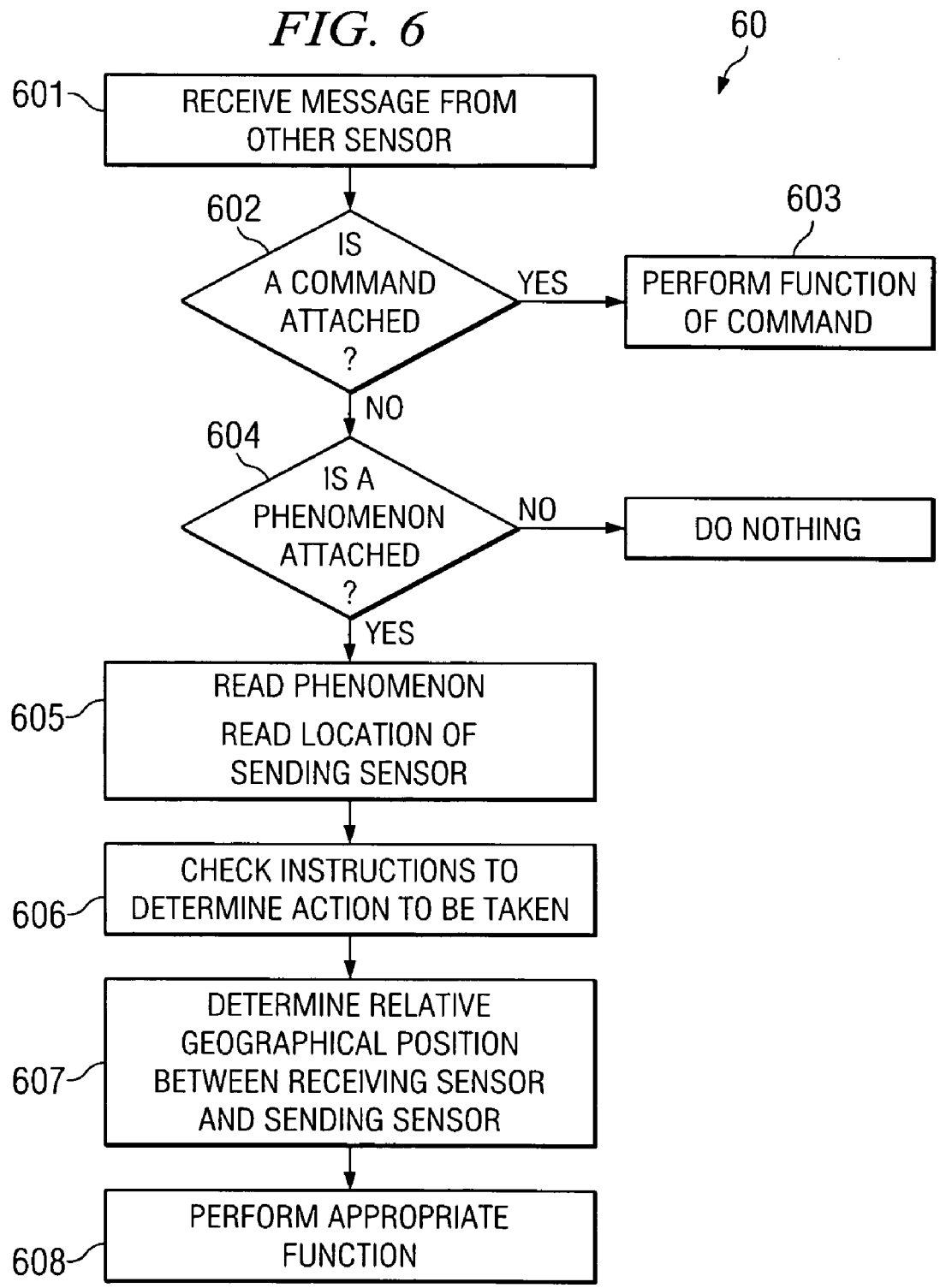

SYSTEM AND METHOD FOR AUTONOMOUS INTERACTION AMONG NEIGHBORING SENSORS IN A NETWORK OF SENSORS

FIELD OF THE INVENTION

This invention relates to measurement sensors and more particularly to a sensor network where neighboring sensors cooperate with one another without central control and even more particularly to sensor networks where neighboring sensors autonomously interact with each other to perform measurements.

BACKGROUND OF THE INVENTION

Many applications of distributed sensor networks require a spatial understanding of where the sensors are located. This geographical location information is necessary so that the system can make decisions to observe a phenomenon at a particular location or observe a phenomenon at a number of locations. For example, if one sensor in a network observes a local phenomenon it may be desirable for other nearby sensors to also observe the same phenomenon. Since it usually would not make sense for all sensors in the network to observe the phenomenon, attempts to control such observation under central control are difficult to achieve.

One structure for achieving this result is for a central controller to keep track of all sensor geographical locations and "instruct" one or more sensors in a desired location to make a measurement, observe a phenomenon, perform an action or a combination thereof. This consumes transmission bandwidth as well as processor time and often is not practical. For example, in prior systems a manual determination is made as to the location of all sensors in a network. Then a "neighbor" list is constructed and distributed to all sensors. In addition to being cumbersome, this approach is prone to errors arising from transmission difficulties as well as from using "stale" data.

BRIEF SUMMARY OF THE INVENTION

Sensors in a network each have a geographical location associated with them and they each periodically broadcast this information to all the sensors in the network. A receiving sensor then builds a list of sensors that are closest to that sensor by computing the distance between itself and the other sensors. This list can then be used along with a decision algorithm to decide whether that sensor should act or perform a command when it receives a message from other sensors.

This geographical neighbor list can be used in several ways. One way is for a sensor to perform an action and then send a message to other nearby sensors to command the neighbor sensors to act in a particular manner. A second way is for a sensor to observe a phenomenon and then broadcast a message to all sensors notifying them that the phenomenon was observed. Each receiving sensor can then determine for itself whether it is near the phenomenon and whether it is capable of acting and if so, determining if it should act in a particular manner based on the broadcast message.

BRIEF DESCRIPTION OF THE DRAWINGS

For a more complete understanding of the present invention, reference is now made to the following descriptions taken in conjunction with the accompanying drawings, in which:

FIG. 1 shows one embodiment of a multi-sensor network with intersensor communication;

FIG. 2 shows one embodiment of a sensor for use in a sensor network; and

FIGS. 3, 4, 5 and 6 show embodiments of the operation of a sensor network.

DETAILED DESCRIPTION OF THE INVENTION

FIG. 1 illustrates one embodiment 10 of a measurement system having a plurality of spaced apart sensors. The concepts taught herein can be used in such a system or can be used with any system in which a data collection point has geographical data about itself that can communicate to other data collection points. In the discussion to follow, a system will be described where the geographical data is communicated among (perhaps as metadata along with measurement data) the various sensors, such as among sensors 20-1 to 20-N.

In the embodiment of FIG. 1, data from the sensors is transmitted, if desired, to data collection 11 via network 12 either wirelessly or by wireline or by a combination thereof. Also note that a network need not be used, but rather some or all of the communications from sensors 20-1 to 20-N can be point-to-point using one or more wireless protocols, such as, for example, the Bluetooth protocol. Also, as will be discussed, certain data can be communicated directly among sensors via link 110 which advantageously would be a wireless link, but could be wireline, if desired.

FIG. 2 shows one embodiment 20 of a sensor having various controls for sending geographical data along with measured data. In the embodiment, the geographical data contained in storage 21 and data from the sensor (for example data obtained via input 25), is stored in storage 23. Note that storages 21 and 23 can be the same storage if desired. Also note that the measured data sent from sensor 20 need not be stored in sensor 20 and can be communicated to data collection 11 as it is collected. Input 25 can measure data, or sense data, or sense conditions and report the results of the "sensing". In addition, data can be provided to sensor 20 from other sensors via intersensor communicator 26. In the discussion herein, measured data sent from sensor 20 includes any mode or manner of collecting and sending such data including data that is observed or communicated from another location. In the embodiment, data is sent under control of processor 22 and intersensor communicator 26, if it is desired to send data to data collection point 11 then communicator 24 can be used.

Control device 202 determines the geographical location of the sensor. This can be accomplished by using any well-known method, such as, for example, GPS built into the sensor, GPS data sent to the sensor, remote determination of sensor location (for example, a cell phone's base station sending the cell phone its location).

Storage 201 shares the geographical location of "neighbors". The definition of "neighbor" can change from time to time and from measured phenomenon to measured phenomenon. These definitions can be downloaded, for example, from collection point 11, and stored in memory 203.

Communicator 24 or intersensor communicator 26 can be used to broadcast the determined physical location of the sensor. When a sensor receives such a broadcast (which can be repeated from sensor to sensor) the sensor can determine, based on instructions locked in memory 203, if the geographical location of a particular other sensor should be stored in storage 202. Based on this storage of other sensor's geographical locations, neighbor list (or lists) can be determined.

By having each sensor independently generate its own list of nearby sensors, no manual system configuration is required and the neighbor table can be dynamically updated as the sensor network grows or changes when sensors are moved or when sensors change status. This significantly reduces the maintenance requirements for large systems and reduces potential for errors such as adding incorrect entries into the location table, entering a location table in the incorrect sensor, or even forgetting to enter a table in a sensor.

Turning now to FIG. 3 there is shown algorithm 30 which could be stored in memory 203 under control of processor 22. Algorithm 30 shows one embodiment for constructing a neighbor list such that when a message is received via process 301 from another sensor having geographical location information within the message the received geographical information is processed according to rules established in memory 203 to construct a "neighbor" list as shown by process 302. The neighbor list then is stored in the "neighbor list" via process 303. This neighbor list can be a single list or it can be different lists depending upon anticipated different measured phenomenon later to be communicated to the sensor. From time to time the algorithm used and stored in memory 203 can be changed. This changing can be, for example, by data collection system 11 under control of processor 101, storage 102 and communication device 103 shown in FIG. 1.

FIG. 4 shows algorithm 40 outlining one embodiment for controlling a neighbor sensor, as shown in process 401, when a sensor, such as sensor 20-1, observes a phenomenon. Process 402 accesses the neighbor sensor list to determine, for the measured phenomenon, what sensors to use for further observation or testing. Under control of process 403 a command is sent to one or more neighbor sensors instructing the recipient sensor(s) to perform a specific function. The manner in which the function will be performed at the receiving sensor will be discussed hereinafter with respect to FIG. 6.

In an alternate mode, algorithm 50, shown in FIG. 5, when process 501 observes a phenomenon, process 502 determines whether this observed phenomenon should be broadcast to all sensors or sent only to selected sensors. If this is a broadcast, then process 503 broadcasts the phenomenon to all sensors in the system. If this is to be a selective broadcast, then process 504 accesses the appropriate neighbor sensor list and based upon the neighbor list process 305 broadcasts the phenomenon only to the sensors on the neighbor list.

Turning now to FIG. 6, algorithm 60 shows one embodiment of how a sensor would process incoming messages. Process 601 receives a message from one or more sensors and process 602 determines if the message contains a measured phenomenon or a command to perform a specific action. If the message is a command message, then process 603 performs the function of the command. This performance can be completely controlled by the sending sensor or the operation can be controlled by algorithms stored, for example, in memory 203 of the message receiving sensor based upon codes or other instructions from the sending sensor. If desired, the receiving sensor can return a message back to the sending sensor or, can send the measured results of the command back to data collection point 11.

If the received message is not a command, then process 604 determines if a measured phenomenon is attached to the message. If not, then nothing is done at this point. If a measured phenomenon is attached, then process 605 reads the measured phenomenon and determines the location of the sending sensor. This determination can be made, for example, by information contained in the message, such as geographical metadata pointing to the location of the sending sensor, or it can be metadata that contains an identification of the sending sensor thereupon facilitating a look up of the sending sensor's location in the neighbor list of the receiving sensor.

Process 606 then checks its instructions, for example, instructions contained in memory 203, and under control of processor 22 determines the relative geographical position between the receiving sensor and the sending sensor. Based upon the relative geographical locations, process 607 performs the appropriate function via process 608. Again, the results can be sent, if desired, back to the sending sensor or to a data collection point. Also, the new measured information can be retrained in storage 23 for further use at a later time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A sensor in a network of sensors comprising:

memory for storing geographical location information therein, said location information pertaining to other sensors;

an input that provides a first measurement of a first phenomenon;

a communication device for sending to said network of sensors a geographical location of said sensor; wherein said communication device is further operable for sending data comprising data pertaining to said first measurement of said first phenomenon, and wherein said communication device is further operable for receiving a message from at least one other sensor in said network of sensors, said received message comprising information pertaining to a second measurement of a second phenomenon input to said at least one other sensor; and a processor that takes action based on said received message, wherein said action comprises making a third measurement on or related to said second phenomenon.

2. The sensor of claim 1 wherein said sent data comprises, at least in part, data pertaining to the identity of said sending sensor.

3. The sensor of claim 1 wherein said sent data comprises, at least in part, data pertaining to the physical location of said sending sensor.

4. The sensor of claim 1 wherein said data pertaining to said first measurement of said first phenomenon is sent to a first to a first one of said sensors in said network but not to a second one of said sensors in said network.

5. The sensor of claim 4, wherein said first one of said sensors is selected based on geographical location information stored in said sending sensor.

6. The sensor of claim 1 wherein said action is in accordance with other data previously stored in said sensor.

7. The sensor of claim 6 wherein said previously stored other data comprises, at least in part, the geographical location of said one other sensor.

8. The sensor of claim 7 wherein said previously stored other data comprises, at least in part, the relative distance between said sensor and said one other sensor.

9. The sensor of claim 1 wherein said first phenomenon and said second phenomenon are the same phenomenon.

10. The sensor of claim 5 wherein said data sent to said first one of said other sensors includes instructions to said first one of said other sensors for performing at least one specific task.

11. A method of sensor operation in a network of sensors, said operation comprising:
  determining a phenomenon at one of said sensors, and performing a particular task at another one of said sensors based on data sent from said one of said sensors, said data dependent upon said determined phenomenon and said task being controlled, at least in part, based on a relative geographical location data between said one of said sensors and said another one of said sensors, and, at least in part, by said sent data;
  wherein said task comprises said another one of said sensors making an observation on or related to said determined phenomenon.

12. The method of claim 11 wherein said particular task is controlled by program logic at said another one of said sensors.

13. The method of claim 11 wherein said another one of said sensors is a particular sensor identified as being in a specific geographical area relating to said sending sensor.

14. A method of sensor operation in a network of sensors, said operation comprising:
  determining a phenomenon at one of said sensors, and performing a particular task at another one of said sensors based on data sent from said one of said sensors, said data dependent upon said determined phenomenon and said task being controlled, at least in part, based on a relative geographical location data between said one of said sensors and said another one of said sensors, and, at least in part, by said sent data;
  wherein said particular task is controlled by said data sending sensor.

15. A method of sensor operation in a network of sensors, said operation comprising:
  determining a phenomenon at one of said sensors, and performing a particular task at another one of said sensors based on data sent from said one of said sensors, said data dependent upon said measured phenomenon and said task being controlled, at least in part, based on a relative geographical location data between said one of said sensors and said another one of said sensors, and at least in part, by said sent data;
  wherein said another of said sensors is a particular sensor which identifies itself based on the fact that said particular sensor is in a specific geographical area relative to said sending sensor.

16. A sensor comprising:
  means for measuring physical attributes at the geographical location of said sensor;
  means for transmitting at least one of said measured physical attributes to at least one other sensor in a geographical area related to said geographical location of said sensor;
  means for determining the geographical location of said sensor;
  means for including in said transmitting of said measured attribute said determined geographical location; and
  means for receiving from other sensors transmitted measured attributes; and means for initiating an action based upon the relative geographical locations between said receiving sensors and a sending sensor and based on the content of said transmitted physical attributes.

* * * * *